United States Patent
Bliss (10) Patent No.: US 9,843,591 B2
(45) Date of Patent: Dec. 12, 2017

(54) BEACON-BASED INDUSTRIAL AUTOMATION ACCESS AUTHORIZATION

(71) Applicant: Rockwell Automation Technologies, Inc., Mayfield Heights, OH (US)

(72) Inventor: Ronald E. Bliss, Twinsburg, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 88 days.

(21) Appl. No.: 15/018,629

(22) Filed: Feb. 8, 2016

(65) Prior Publication Data
US 2017/0230378 A1  Aug. 10, 2017

(51) Int. Cl.
H04L 29/06   (2006.01)
H04W 4/06   (2009.01)
H04W 24/10   (2009.01)
H04W 4/00   (2009.01)

(52) U.S. Cl.
CPC ........ H04L 63/105 (2013.01); H04L 63/0428 (2013.01); H04W 4/008 (2013.01); H04W 4/06 (2013.01); H04W 24/10 (2013.01)

(58) Field of Classification Search
CPC .... H04L 63/105; H04L 63/0428; H04W 4/06; H04W 4/008; H04W 24/10
See application file for complete search history.

(56) References Cited

U.S. PATENT DOCUMENTS

| | | | |
|---|---|---|---|
| 5,586,050 A * | 12/1996 | Makel | B67D 7/08 340/5.92 |
| 7,928,829 B2 * | 4/2011 | Hermann | B60R 25/24 340/5.2 |
| 9,057,210 B2 * | 6/2015 | Dumas | |
| 2004/0114779 A1 * | 6/2004 | Blazey | G07C 9/00007 382/100 |
| 2014/0207686 A1 * | 7/2014 | Experton | G06F 19/3418 705/51 |
| 2014/0292481 A1 * | 10/2014 | Dumas | G07C 9/00111 340/5.61 |
| 2015/0237193 A1 | 8/2015 | Zeilingold et al. | |

FOREIGN PATENT DOCUMENTS

WO   2015187608 A1   12/2015
WO   2016003108 A1   1/2016

OTHER PUBLICATIONS

Ansari, N. et al., "Networking for Critical Conditions [accepted from open call]," IEEE Wireless Communications, IEEE Service Center, Piscataway, NJ, US; Apr. 1, 2008, pp. 73-81, vol. 14, No. 2, ISSN: 1536-1284.

* cited by examiner

Primary Examiner — Beemnet Dada (57) ABSTRACT

Techniques to implement beacon-based access authorization to industrial assets in an industrial automation environment are disclosed herein. In at least one implementation, each industrial asset has one or more beacons that broadcast signals enabling a mobile device to measure its distance from the broadcasting beacon. Each signal also can include access level data defining access permitted for various users, depending on the user's authorization level and the calculated distance between the mobile device and the broadcasting beacon. In some implementations the mobile device can provide directions to the user to enable an otherwise disallowed operation. Access to industrial assets is thus limited by the calculated mobile device distance from the industrial asset and the user's authorization level.

20 Claims, 5 Drawing Sheets

BEACON-BASED INDUSTRIAL AUTOMATION ACCESS AUTHORIZATION

TECHNICAL FIELD

Aspects of the disclosure are related to the field of industrial automation control systems.

TECHNICAL BACKGROUND

In prior control systems utilizing local networks, a user who was controlling operation of one or more industrial assets in an industrial environment was located nearby because operations could not be controlled remotely. With the growth of remote access to industrial assets (e.g., via Ethernet and wireless networks), users can connect to a given industrial control system from virtually anywhere. For example, mobile computing devices can access a control system via wireless communications, so a user could be located anywhere within a site's Wi-Fi network or offsite. This raises the possibility of user access in situations and locations where the user is unable to view the control system to see the changes being made, or is otherwise too far from the relevant system or equipment. Users can interact with machines, control systems and other industrial assets (e.g., making real-time changes to plant floor operations, reviewing performance and operational data).

These remote access capabilities allow various users to use a browser and/or applications to instantly access information about and make adjustments and changes to operating equipment whether the user is at another plant, in a control room or on the road. For example, the operator of an equipment line could determine if equipment was over-dispensing and remotely change parameters to reduce product waste. Such capabilities are helpful for system integrators and OEMs that want to monitor customer installations, perform diagnostics or provide support for visualization applications they have deployed and can be important for applications that require monitoring of remote, unattended sites, such as in the water/wastewater, oil and gas, and mining industries. However, some user interactions with machines, control systems and other industrial assets may require the person taking action only when physically present at the operations location.

Overview

Techniques to limit access to industrial assets in an industrial automation environment are disclosed herein. In at least one implementation, a specific industrial asset (also referred to as a "target device") has a beacon system comprising one or more beacons (e.g., LE Bluetooth beacons). Each beacon broadcasts a beacon signal that enables a computing system that comprises a mobile device to measure the distance of the mobile device from the broadcasting beacon. Each beacon signal also can include access level data that defines what types of access are permitted for various users, depending on the user's authorization level (e.g., authorization levels being defined by an individual's role in a given company or industrial automation environment) and the calculated distance between the mobile device and the broadcasting beacon. The beacon signal data can be encrypted information that the mobile device is configured to decrypt and process. In some implementations the mobile device can provide directions to the user to enable an otherwise disallowed operation. Thus beacon-based industrial automation access authorization limits the operations that a user with a mobile device can perform on an industrial asset by detecting the mobile device's physical location utilizing a beacon system comprising one or more beacons associated with the relevant industrial asset. Access privileges for a given user (based on the user's organizational role) are defined by the beacon signal data and limited by the calculated mobile device distance from the industrial asset.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In an industrial automation environment, user interaction with industrial assets is available via a communication network that connects and provides access to machines and other equipment. For example, various user types (e.g., operators, engineers, maintenance personnel, technicians and other users) commonly review tag data, trends, alarms, documentation, incident reports, chat transcripts, screen captures, and other content that is generated during the course of operating an industrial enterprise. Moreover, such users have greater flexibility and mobility to make real-time changes to industrial environment operations using Web-enabled processes, and using on-site wired and/or wireless networking and the like that allow users to access system and machine parameters from remote locations, including outside a plant or other industrial automation environment. One example of this type of process is found in various versions of FactoryTalk® software from Rockwell Automation. Enhanced security in such access systems allows administrators to define user groups and assign them specifically defined access rights (e.g., for view and write capabilities, including the capability to make changes to industrial automation operations and equipment).

Thus, as extended wireline and wireless networks have become more common, an authorized user may be able to connect to industrial assets in an industrial environment (e.g., using a mobile device) from locations where the user is unable to view (or is otherwise too far away from) the industrial assets(s) on which changes may be implemented. For example, users can access an industrial environment control system via various networks (e.g., wireless communication and Ethernet), thus allowing user access from a location external to the industrial environment.

Mobile device access to control systems and other industrial assets can be advantageous, but there is a desire to limit what can be done based on proximity to affected equipment (e.g., using line-of-sight as a guide, some users should be within visual range of equipment before making changes or otherwise affecting equipment operation). By placing one or more beacons on the subject equipment and defining a minimum user distance, an equipment designer can limit the user-equipment separation that will be permitted for a user to access or make changes, thus ensuring that they are within a visual range of what they are doing. Bluetooth low energy (BLE) beacons provide one good type of beacon for establishing user location. Each BLE beacon has an adjustable range (e.g., up to ~150 feet in some implementations) and can be associated with a specific GPS location. By combining this distance-limiting feature with security restrictions based on a user's role in the industrial automation environment, implementations of beacon-based industrial automation access authorization can ensure that an authorized user is within a proper working distance from a selected industrial asset (target device). Beacons can be integrated into on-equipment I/O devices, sensors, processors, display systems, etc. or industrially suitable (e.g., hardened) beacons could be configured to work with an existing security system to limit what users can do based on physical location.

Implementations of beacon-based industrial automation access authorization thus limit or otherwise define the operations that a given device and/or user can perform or implement with a computing system (e.g., a computing system that is part of or includes a mobile device such as a smartphone, notebook, smart watches, tablet, cell phone, etc.) in connection with a target device (e.g., a selected industrial asset such as a running machine or control system). Limiting access to a given target device is determined by calculating the physical location of the mobile device using beacons that are situated in proximity to (or mounted on) the potentially affected target device and by utilizing access level data (e.g., security settings defining access for specific user groups) that are pre-configured into the beacons. The beacons can be limited-range, low-energy beacons such as Bluetooth LE beacons. Before a user command can be executed regarding a given target device operation, both the user's access level authorization and any distance limitation(s) must be met.

In some implementations each broadcasting device (beacon) is a one-way transmitter to the receiving mobile device and necessitates a specific application installed on the mobile device to interact with the beacons. This results in the installed application (and any associated security system) tracking users.

Each individual beacon is configured with information regarding its installed location (e.g., associating the beacon with a particular industrial asset and its location) and is configured to broadcast its pre-configured location information (e.g., in advertising mode, BLE beacons can be programmed to transmit data packets in intervals from 20 milliseconds to 10 seconds, depending on factors such as desired battery life). The mobile device is configured to detect one or more beacons, receive each specific beacon's signal and any data contained therein, and thereafter determine the user's position relative to the broadcasting beacon. Also, each beacon's identity is unique so that an industrial environment access authorization system can track user actions based on beacon interaction. Moreover, each beacon's location can be defined and its security settings set so that specific operations can be implemented only if specific conditions are met regarding at least (1) user access authorization (and/or mobile device authorization) to perform the desired operation and (2) appropriate physical proximity to the relevant industrial asset. Thus the industrial environment access authorization system determines the granting of a given access level to a user based at least in part on proximity to the physical location of an industrial asset as defined by one or more beacons (i.e., that industrial asset's beacon system). In some implementations, each time a user attempts to perform an operation using a mobile device, the mobile device software (e.g., an application) combines the user's identity and the user's location to initiate a request to the security system to determine the level of capabilities that will be permitted (e.g., no access, read-only, full access). Because security details (e.g., access levels) can be contained in the broadcast beacon signal data, implementations eliminate the need to have each mobile device cache such security details or to require it to communicate with a security system server.

Each time a user attempts to perform an industrial asset operation using the mobile device, the mobile device processes received information regarding the user's identity (e.g., that person's access level or other group affiliation) and calculated distance from the target device (based on received distance calculation data) to generate a request to the access authorization system to grant or deny access to any requested capabilities. In such implementations a user may be blocked from controlling an industrial asset (or, for example, limited to "read only" status) if the user's mobile device is out of range of that industrial asset's beacon system and/or if the user does not have access clearance to perform the desired operation(s). On the other hand, a user mobile device will be granted access consistent with that user's access level if the mobile device is close enough to the target device and the mobile device and/or user have access authorization clearance for the requested operation.

Such interactions between users, mobile devices and industrial assets can include generating audit trail data that memorializes such actions. Limits on user access can include a complete denial of access (e.g., to a screen, attribute and/or other operation), "read only" access (e.g., to a screen, attribute and/or other operation), or full access (e.g., to modify a screen's contents, attributes, and/or other actions affecting industrial asset operation). Thus access and security are provided and partitioned based on the specific operation a user is seeking to invoke using a mobile device rather than restricting access to whole screens (i.e., an all-or-nothing access scheme). In some implementations, when an operation invoked by a user is prohibited due to a distance threshold being exceeded, the mobile device can provide a user with location directions (e.g., when a user is too far from a given industrial asset, but otherwise authorized to perform the requested operation remotely) so that the user can shift their position to a location that will permit the invoked operation to be performed.

In some implementations security settings and information (e.g., access level data), can be loaded into each beacon so that each beacon pushes settings and/or other information to a mobile device. Such security information can be protected by encrypting the security information in a manner that permits decryption only by authorized mobile devices and/or users. Such security information can be organized by user type (e.g., operator, maintenance personnel, engineers) in order to minimize the amount of information that needs to be stored in and broadcast by a beacon. Audit tracking of a given user can be based on the access level granted to that user.

Controlling mobile device access to industrial assets based on a combination of distance and access level in an industrial automation environment using beacons may achieve the technical effect of ensuring that user-invoked operations on a mobile device with regard to an industrial asset are only executed when the mobile device and user are in a suitable physical location relative to the affected industrial asset. The use of beacons to accomplish this achieves the further technical effect of eliminating the need for an operation-invoking mobile device to cache security details or communicate with a system security server.

Figure 1:
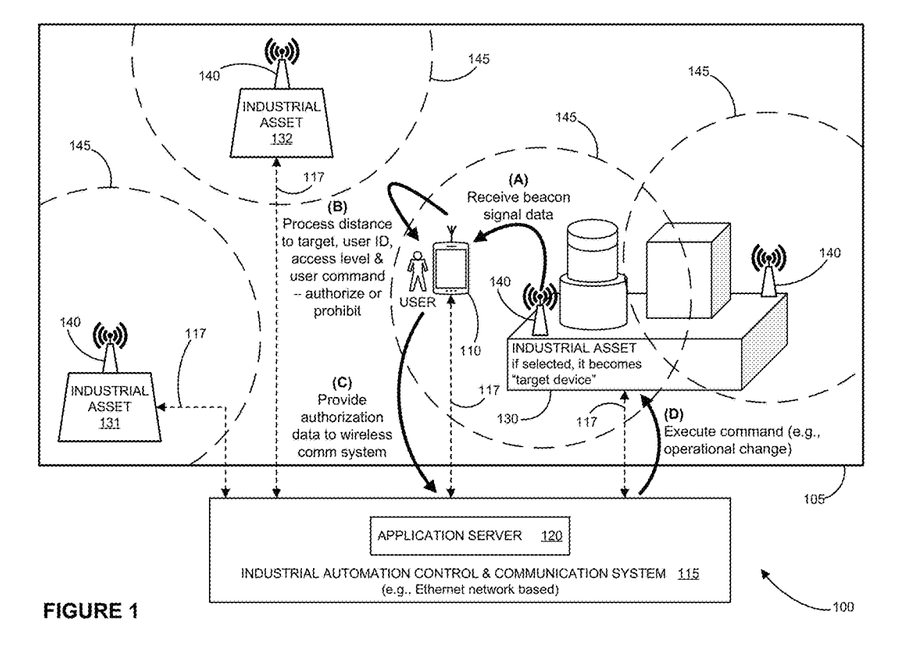
FIG. 1 is a block diagram that illustrates an operation of a beacon-based industrial automation access authorization system in an exemplary implementation.
Figure 2:
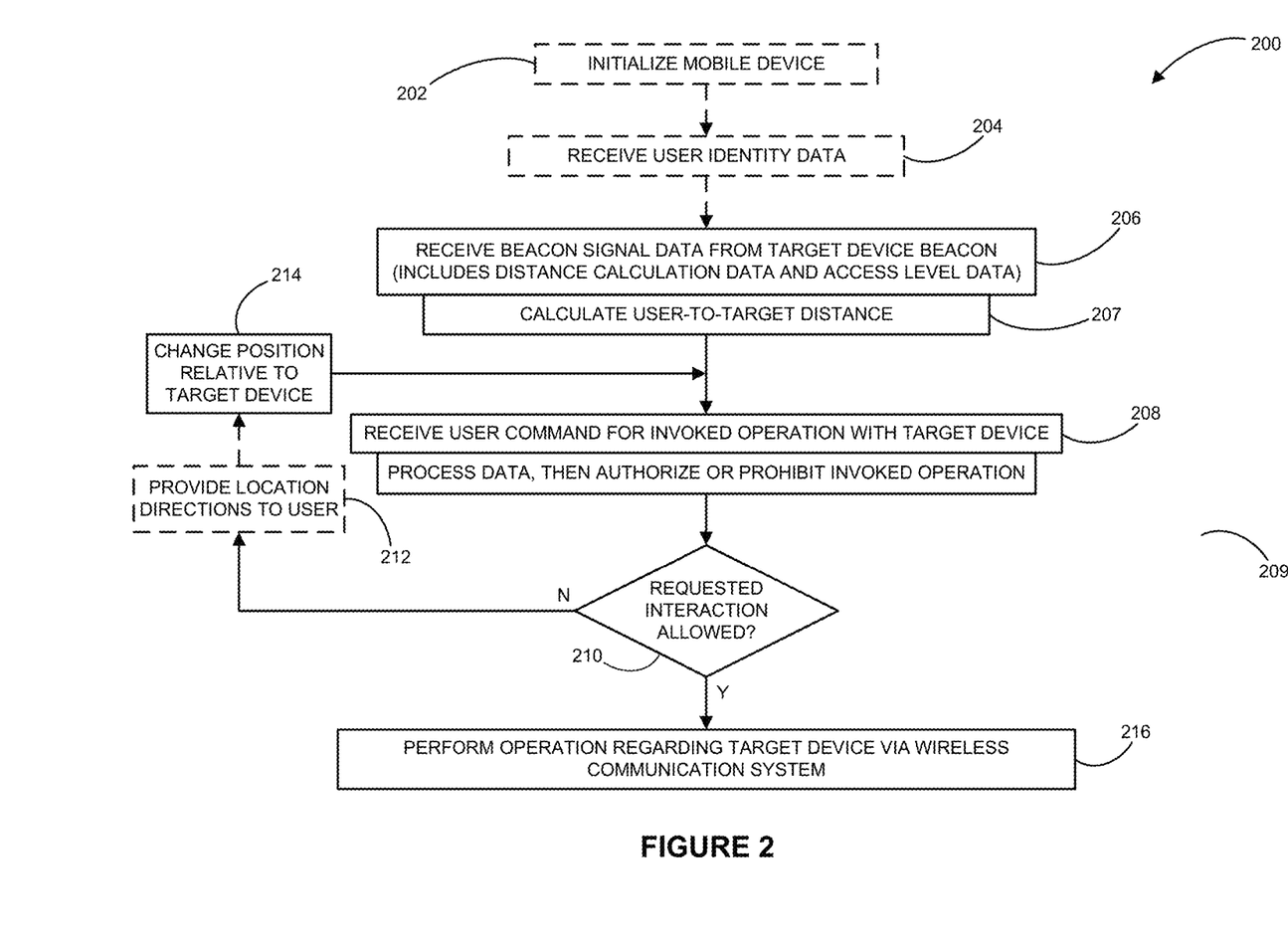
FIG. 2 is a flow diagram that illustrates an operation of a beacon-based access authorization system in an exemplary implementation.
Figure 3A:
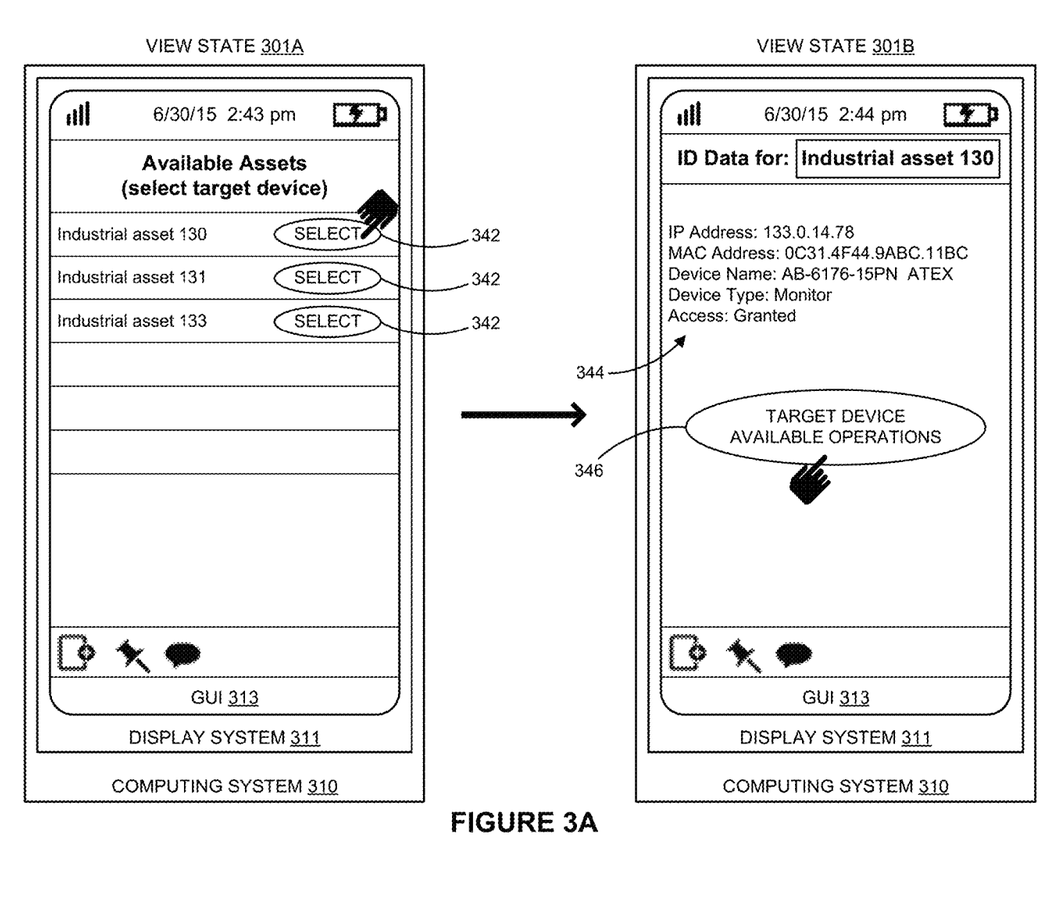
FIGS. 3A and 3B are block diagrams that illustrate an operational scenario involving a computing system in an industrial automation environment in an exemplary implementation.
Figure 3B:
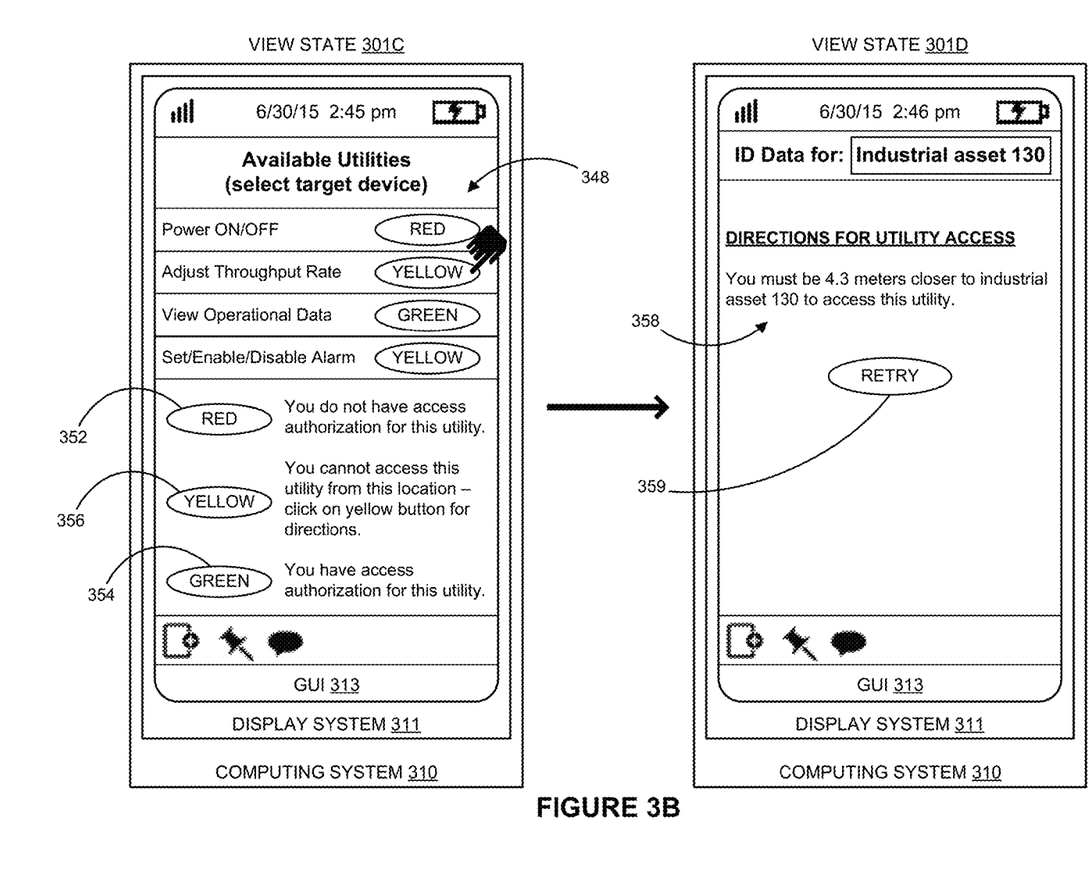
Figure 4:
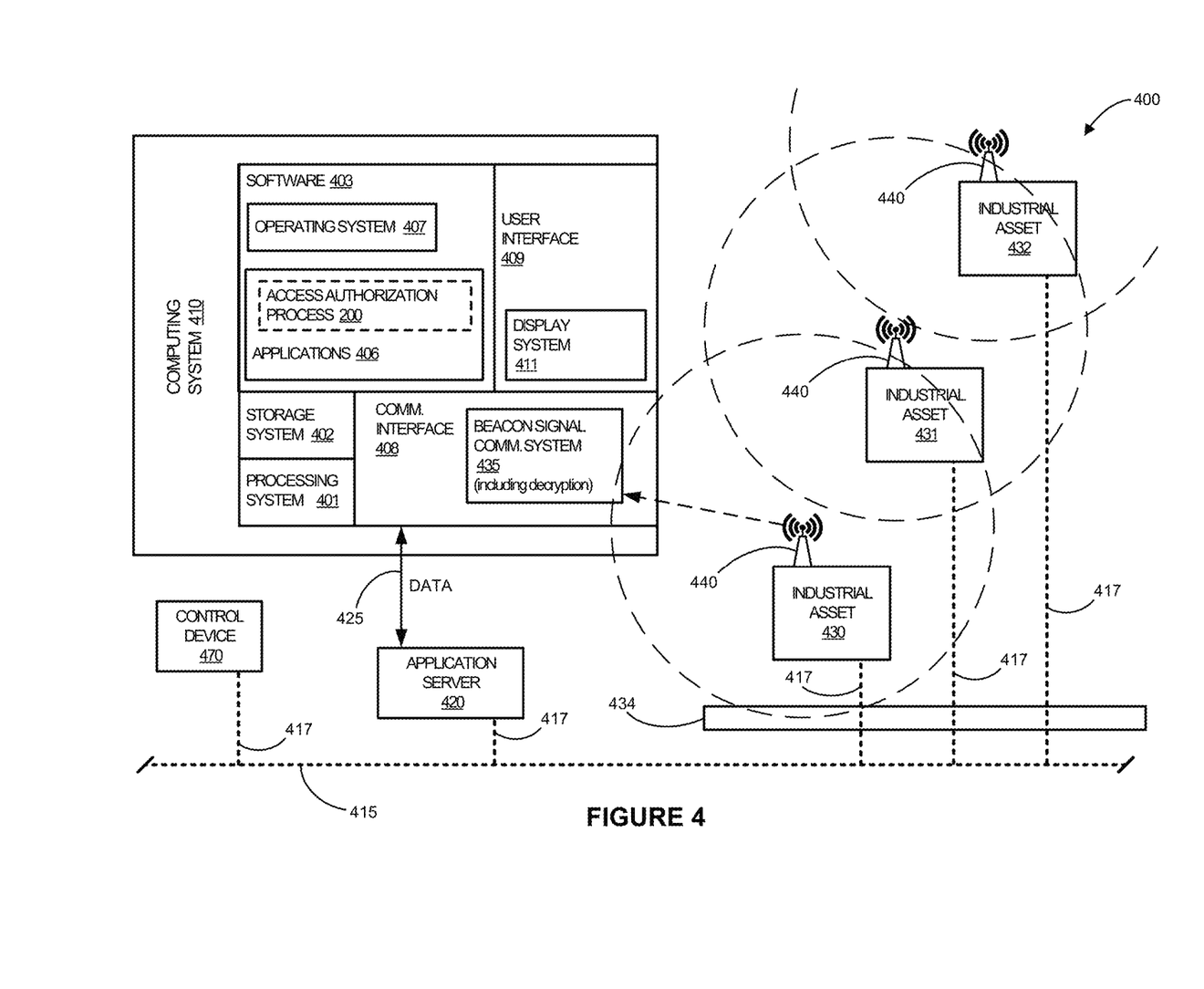
FIG. 4 is a block diagram that illustrates an operational scenario involving a computing system in an industrial automation environment in an exemplary implementation.

Referring now to the drawing, FIG. 1 illustrates an industrial automation environment and an operational scenario in which a beacon-based industrial automation access authorization is implemented. FIG. 2 illustrates a beacon-based industrial automation access authorization process that may be performed by a computing system. FIG. 3 illustrates an operational scenario involving a computing system in an exemplary implementation of beacon-based industrial automation access authorization. FIG. 4 illustrates an exemplary industrial automation environment that includes a computing system that may be used to execute a beacon-based industrial automation access authorization process and to perform any of the access authorization processes and operational scenarios described herein.

Turning now to FIG. 1, an operational scenario of a beacon-based industrial automation access authorization system 100 is illustrated in an exemplary implementation. System 100 implements beacon-based industrial automation access authorization within an industrial environment 105 using a mobile computing system such as mobile device 110 that is configured to communicate with an industrial control and communication system 115, for example over a wireless communication network. Depending on the implementation, mobile device 110 may be a computing system by itself or may be part of a larger computing system that includes system 115. Other variations are also possible. A number of industrial assets 130, 131, 132 are present in environment 105 and each industrial asset 130, 131, 132 has a beacon system made up of one or more beacons 140 that broadcast beacon signals 145. Each beacon 140 can be a Bluetooth low energy (BLE) beacon or a similar limited-range broadcasting device that is configured to enable mobile device 110 to determine its distance from a given beacon 140 based on that beacon's broadcast signal 145. For example, if each beacon 140 is a BLE device, it can provide a transmit-only mode (BLE's "advertising" communication component) that provides a low cost device with limited resources. In some implementations each beacon 140 will be set up with a unique beacon identity (e.g., which can be broadcast as beacon identity data in beacon signal data), a definition of the beacon's location and security settings or other information (e.g., encrypted user type access levels) that define access authorization relating to the beacon; some or all of this can be encrypted. These attributes and information can be loaded by an engineer or other individual prior to deployment of the beacons to specific industrial assets in the industrial automation environment. Beacon signal data can be loaded into beacons in one or more ways. A computer can be directly (e.g., physically) connected to the beacon and beacon signal data transmitted using a wired or other physical delivery means. Such loading can be accomplished using an embedded communications interface (e.g., universal serial bus (USB)), wireless communication (e.g., Bluetooth communication), and/or via a central communication system (e.g., system 115 of FIG. 1) to which a beacon is linked. In some implementations additional flexibility can be provided by connecting each beacon (and/or other limited-range broadcasting device) to such a central communication control system in the industrial environment (e.g., via an Ethernet network) so that beacon information, data, etc. can be updated and other changes made to an industrial automation environment's beacon array via a central system. When such a network learns of or knows of a given beacon and its location, the system can automatically load and/or update such a beacon with appropriate information and/or data to enable mobile access.

In addition to broadcasting a signal 145 that allows distance to be measured between mobile device 110 and a given beacon 140, the beacon signal can provide additional information to mobile device 110. For example BLE beacon advertising signals 145 may include payload data, allowing unilateral data transmission from each beacon 140 to mobile device 110 (e.g., using only the advertising communication component of BLE). In other implementations beacons 140 can engage in two-way communications with mobile device 110 to permit the transmission of information (e.g., using both of BLE's advertising and connecting communication components).

Data broadcast to mobile device 110 can include access level data (e.g., access rules and limits) that define what types of operations various identified users can perform using mobile device 110 depending on the user's authorization level (e.g., the user's employment or other role in a given industrial automation environment's network) and distance thresholds. Thus members of one group, say maintenance personnel, might only be allowed to implement specific changes to an industrial asset's operation if they have sufficient authorization and are within a specified distance (e.g., visual line-of-sight proximity) from the target device; if the maintenance personnel are outside the specified distance limit, they might be prohibited from implementing the operational change. Using the same type of implementation, an engineer might be allowed to make the same type of operational change irrespective of his/her distance from the target device. In some implementations an engineer might be permitted "read only" access to a mobile computing system screen depicting operation of a given target device if the engineer is not within a specified distance threshold, while the same engineer could implement changes based on the engineer's access level (e.g., a group access level or designation) using the same mobile device screen if the engineer is close enough to the target device. The access data broadcast to mobile device 110 in system 100 can be encrypted in a manner that only permits decryption of the access data (and any other broadcast data) by authorized mobile devices.

Industrial assets 130, 131, 132 and mobile device 110 can communicate using links 117, which can be wireless, cellular and/or other wireless linking of devices within system 115, which can include an application server 120 (e.g., that manages wireless communication within the relevant industrial environment) and other components that monitor and control access to industrial assets in the industrial automation environment 105. Mobile device 110 must have the correct access authorization/distance combination to be granted access for various user commands invoking operations directed to target device 130 via network links 117 and system 115.

An exemplary operation of system 100 is illustrated in FIG. 1, the order of which is designated by the reference letters (A) through (C), but note that the steps could be performed in any order for any operation described herein. A communication network in some examples could comprise an on-premises private network or private cloud accessible over a local network connection, a public cloud-based environment accessible over a wide area network such as the Internet, or any other deployment scheme, including combinations thereof. A mobile device 110 can be any of the devices noted herein.

In many industrial environments, security is a critical concern and access to various information and control and other systems is limited to those individuals whose responsibilities require such access, which may only be appropriate in specified locations. Likewise access is limited to only those devices appropriate for carrying out such responsibilities. Thus, in some implementations of beacon-based industrial automation access authorization using a wireless communication system within an industrial environment, mobile device 110 of system 100 must first be programmed, initialized, and/or authorized to receive (and possibly decrypt) asset beacon signal data in a given industrial automation environment, which can be achieved via initialization (e.g., a handshake and/or other process) between mobile device 110 and system 115 in FIG. 1. Mobile device 110 or an application installed thereon may also be pre-configured to enable mobile device 110 to receive beacon signals 145 in FIG. 1.

During such initialization, mobile device identifying information and other data can be exchanged between mobile device 110 and application server 120. In some implementations both the mobile device and its user must be cleared to be operable within an industrial environment's wireless communication system. Moreover, in some implementations of beacon-based industrial automation access authorization, the mobile device 110 requires user-identifying data from the individual using the mobile device, such as identification of a group, level, etc. associated with a given user type (e.g., engineer, maintenance personnel, OEM personnel, equipment operator) and/or other user-identifying data (e.g., a user class identification, which may or may not be based on the user's role in the industrial automation environment, that is assigned to each authorized user of the beacon-based industrial automation access authorization system in a given industrial automation environment). In some implementations initialization of the mobile device itself might be unnecessary (e.g., where a pre-loaded application on the mobile device includes decryption and other required functionalities provide sufficient security for use of the mobile device.

Once mobile device 110 and its user have completed any required initialization (e.g., receiving user identity data that identifies the user type, name, class, group, or other access level identifier), mobile device 110 can be granted limited and/or defined access to industrial assets in industrial automation environment 105 as described herein. In FIG. 1 mobile device 110 detects and receives a beacon signal and its beacon signal data (step (A)) being broadcast from one of the beacons 140 associated with industrial asset 130 as the target device. Mobile device 110 receipt of the beacon signal data includes data that allow mobile device 110 to calculate its distance from the broadcasting beacon 140 and to determine what access level is permitted for the target device 130 involved. The beacon signal data can also include beacon identity data that allows a security or other audit system in environment 105 to track user activity. When mobile device 110 receives a user command invoking an operation (e.g., via a display system or other user interface), mobile device 110 then processes the user command, user identity data, access level data and calculated distance from target device 130 (step (B)) to determine whether the invoked operation is authorized or prohibited.

Based on the access level granted, if any, to mobile device 110, it then utilizes links 117 and communication system 115 (steps (C) and (D)) to execute a user command and perform the invoked operation with regard to the target device 130. If the access level required by a beacon signal is not met by the user's identity data, then the invoked operation is prohibited. In some implementations mobile device 110 is configured to provide a user with directional information that allows the user to improve, upgrade or otherwise change the user/mobile device access level based on distance from the relevant beacon 140, for example when an invoked operation is prohibited due to a distance threshold being exceeded.

FIG. 2 is a flow diagram that illustrates a beacon-based industrial automation access authorization operation 200 in an exemplary implementation. Access authorization operation 200 shown in FIG. 2 enables authorization of a user and mobile device and their interaction with industrial assets in an industrial automation environment based on the user's access level and the distance between the mobile device and a targeted industrial asset (the target device). The steps of the operation are indicated below parenthetically. The following discussion of operation 200 will proceed with reference to system 100 of FIG. 1 in order to illustrate one implementation of its operation, but the details provided in FIG. 1 are merely exemplary and are not intended to limit the scope of process 200 to the specific implementation shown in FIG. 1.

Mobile device 110 is optionally initialized (202) by a control and communication system such as a wireless local area network (WLAN). This initialization step can include activating, installing, configuring and/or updating a user access authorization application that will operate on a mobile computing system that is part of mobile device 110. Mobile device 110 can also optionally receive user identification data (204), for example, by having the user input a password or other unique identification information. Also, mobile device 110 may be operated by only one user (e.g., a personal smartphone, smart watches, notebook, tablet or other mobile computing system, or a one-user-only mobile computing system owned by the user's employer or the like such as a mobile human machine interface (HMI) device that is maintained in the industrial automation environment).

As the mobile device 110 is moved about the industrial automation environment 105, it detects beacon signals 145 generated by beacons 140 that are configured to be associated with various industrial assets 130, 131, 132 and their respective locations. The user nears industrial asset 130 and mobile device 110 detects one of the beacon signals associated with industrial asset 130, which will be referred to as the target device 130. Mobile device 110 receives beacon signal data from the target device beacon (206), the beacon signal data comprising distance calculation data and access level data. In some implementations the beacon signal data will be encrypted or otherwise protected from unauthorized use. When such protection is used, the access authorization application on mobile device 110 can include security settings and/or data that permit the decryption or other discovery of the beacon signal data. The distance between the mobile device and the target device is calculated (207) using the received distance calculation data.

Mobile device 110 receives a user request (208) to perform an operation (e.g., requesting a change to an operational characteristic of target device 130, viewing a screen providing operational data regarding target device 130, or setting an alarm) with regard to target device 130 (e.g., via a user interacting with a display system or other user interface in the mobile computing system that allows a user to invoke an operation such as a function, data request, etc.). Mobile device uses the beacon signal data to determine permitted interactions between the mobile device and the target device (209). That determination is based on the user identification data and calculated distance between mobile device 110 and target device 130 (other factors may be considered as well).

A decision is made (210) as to whether the user's requested interaction with target device 130 is allowed. If the requested interaction is not permitted, then a message can be displayed to the user. If the requested interaction is never permitted for a user having the received identification data, then a message to that effect can be displayed (e.g., saying that "You are not authorized to perform this function under any circumstances" or words to that effect). If the requested interaction is not permitted due to the location of the mobile device 110 relative to the target device 130 (i.e., prohibited due to a distance threshold being exceeded), then the access authorization application in mobile device 110 can optionally provide directions to the user (212) that will allow the user to change position to improve the chances of being able to perform the desired function. The user can change position (214) before reattempting the requested interaction (208).

If the user is in an appropriate position (i.e., within a given distance limitation for the target device 130) and the mobile device 110 has been provided with identification data that enables the requested interaction, then the interaction is executed (216). The decision (210) as to whether the requested interaction is allowed can be performed by mobile device 110 or can be provided by control and communication system 115 (using identification data, distance and any other relevant beacon signal data provided by the mobile device 110). Both scenarios are helpful in tracking interaction requests (whether granted or not) so that system auditing can be facilitated. That is, whether data and user requests are processed in mobile device 110 or by system 115, data regarding the user's identity, the requested interaction, timestamp(s), the target device 130 (and the specific beacon through the user obtained enabling beacon signal data) and more can be collected.

FIGS. 3A-3B include block diagrams that illustrate an operational scenario of a computing system 310, which can be implemented at least in part on a mobile device and/or part of a larger computing system in exemplary implementations. Computing system 310 includes display system 311 which displays a graphical user interface (GUI) 313. In this example, display system 311 comprises a touchscreen that displays GUI 313 for the user to interact with and accepts input user commands via the user's touches on the surface of the touchscreen. In each of FIGS. 3A and 3B, two different view states are shown displayed on display system 311, labeled 301A and 301B in FIG. 3A and 301C and 301D in FIG. 3B. The different view states show the changes that occur to GUI 313 as the user makes selections and interacts with GUI 313 while computing system 310 access authorization is defined and/or controlled at least in part by one or more industrial asset beacons and their respective beacon signal data.

In view state 301A, the user is presented with available industrial assets (e.g., industrial assets 130, 131, 132 from FIG. 1). The listed industrial assets may be known to computing system 310 (e.g., being pre-programmed, available via a wireless control and communication links 117 and system 115, available via an application installed on computing system 310) and/or may be discoverable using their beacon signals and/or by other means. A target device (industrial asset) may be selected by a user by touching one of the SELECT buttons 342. Once a target device is selected (as industrial asset 130 has been selected as seen in view state 301B), industrial asset data 344 for the target device 130 can be displayed so that the user can confirm the industrial asset selection. Assuming that the user has the desired industrial asset selected as the target device, then button 346 allows the user to view available operations (and in some implementations denied operations) for that target device.

Turning to FIG. 3B, a list 348 of available operations (e.g., utilities, functions, alarms, data screens, other screens) is presented to the user for the target device 130. In the implementation of view state 301C, the availability of each operation is color-coded for simpler user operation. For example operations that are prohibited for a given user under all circumstances can be accompanied by a red button 352 (or, in other implementations, might not be presented at all). If the user touches a red button 352, an explanatory screen or options for alternatives to the user might be presented.

Operations for which access authorization is presently granted can be accompanied by a green button 354. If the user touches a green selection button, that operation is invoked and an appropriate screen or other display is provided to the user. If the user is authorized to invoke an operation (based on the user's identity and the industrial asset's access level requirement as broadcast by any associated beacon(s)), but is too far away from the target device 130, then touching the accompanying yellow button 356 can generate a direction screen, as seen in view state 301D, which provides directions 358 to the user to enable the desired operation. Once the user has made a location adjustment, the user can then touch a RETRY button 359 to re-attempt invocation of the operation.

FIG. 4 is a block diagram that illustrates beacon-based industrial automation access authorization in an industrial automation environment 400 in an exemplary implementation. Industrial automation environment 400 provides an exemplary environment in which to implement the beacon-based industrial automation access authorization systems and processes disclosed herein, but other environments could also be used. Industrial automation environment 400 includes computing system 410 (all or a portion of computing system 410 can be contained and operate within a mobile device), industrial assets 430, 431, 432, wireless links 417 and network 415, application server 420 and control device 470. Note that there would typically be many more industrial assets in most industrial automation environments, but the number of industrial assets shown in FIG. 4 has been restricted for clarity in this non-limiting example. Industrial assets 430, 431, 432 are connected to network 415 using appropriate wireless links 417.

Industrial automation environment 400 can comprise an automobile manufacturing factory, food processing plant, oil drilling operation, microprocessor fabrication facility, or some other type of industrial enterprise. Industrial assets 430, 431, 432 could comprise sensors, drives, pumps, filters, drills, motors, robots, fabrication machinery, monitors, human machine interface devices and systems, mills, printers, or any other industrial automation equipment, including their associated control systems (e.g., automation controllers, programmable logic controllers (PLCs), programmable automation controllers (PACs), or any other controllers used in automation control). Additionally, industrial assets 430, 431, 432 could comprise other industrial equipment, such as brew kettles in a brewery, reserves of coal or other resources, or other elements that may reside in an industrial automation environment 400.

There is a beacon system associated with each industrial asset, wherein each beacon system comprises one or more beacons 440 that are configured to emit a beacon signal (e.g., a BLE beacon configured to operate in an advertising-only mode, or in an advertising plus connecting mode). Beacon signals can be detected using a beacon signal communication system 435 in which a detecting device (i.e., mobile computing system 410) is able to detect and receive signals generated by beacon systems associated with industrial assets within a specified detection range. That range may be defined by the types of beacons used and/or may be defined by an administrator or the like in the industrial automation environment.

Beacon signals containing beacon signal data are generated by the beacon systems of industrial assets 430, 431, 432 and are received by the communication system 435 of computing system 410. The beacon signal data may be dependent upon the communication mode of the beacons used and can include distance calculation data and access level data. Where the beacons 440 operate only unilaterally in an advertising mode or the like, then the beacon signals can include distance calculation data that comprises transmit power data (e.g., per the BLE protocol) and can include access level data that could be part of payload data (e.g., per the BLE protocol). Beacon signal data can also include data a universally unique identifier (UUID) for the specific beacon and can also include data identifying the industrial asset with which the beacon is associated. Some or all of the distance calculation data, access level data, beacon identifying data and/or industrial asset identifying data can be encrypted in an appropriate manner.

Computing system 410 also is able to communicate via links 417 and network 415 (e.g., through a server 420 or other communication device that coordinates communications on links 417 and a wireless communication network 415, which can be an Ethernet network in some implementations). A network administrator may control operation of network 415 using a control device 420, which also can be used for configuring beacons with desired distance calculation data, access level data, beacon identifying data, industrial asset identifying data, etc. Network 415 permits full functional communication between authorized devices communicating over links 417 of network 415. Control device 420 can include desktop computers, laptop computers, server computers, and virtual machines, as well as any other type of computing system, variation, or combination thereof.

In industrial environment 400 the beacons 440 of beacon systems associated with industrial assets 430, 431, 432 are able to broadcast beacon signal data to computing system 410, which can then enable use of network 415 and links 417 as defined. In some examples server 420 controls network 415 and/or communication between such network elements directly. In other examples various industrial assets might utilize a secondary communication device 434 (e.g., a router, gateway, telecommunication switch, server, processing system, or other communication equipment) as proxy for the industrial assets coupled to the secondary communication device 434. Network 415 can include multiple servers, multiple control devices, multiple secondary devices and numerous industrial assets and the configuration illustrated in FIG. 4 is provided as a non-limiting example of an implementation.

Authorized communication between computing system 410 and a target device such as industrial asset 430 can be regulated using an application on mobile computing system 410 by processing the beacon signal data received from a specific beacon. The application will prevent a user from executing a operation that is prohibited due to restrictions based on the user's access level or due to the distance of a mobile device from the target device. In some implementations, data regarding all user and mobile device activity in industrial automation environment 400 can be recorded and utilized for auditing and other purposes.

The communication links over which data is exchanged between various components of environment 400 can comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 410 may be representative of any computing apparatus, system, or systems (that at least include a mobile device) on which beacon-based industrial automation access authorization processes disclosed herein or variations thereof may be suitably implemented. Examples of mobile devices usable in connection with or as computing system 410 include devices such as portable industrial automation control and/or computing units, cell phones, smartphones, smart watches, tablet computers, laptop computers, notebook computers, handheld computers, wearable computer devices, and gaming devices, as well as any other type of mobile computing devices and any combination or variation thereof. In some implementations, mobile computing system 410 can comprise a mobile device capable of operating in a server-like fashion which, among other uses, could be utilized in a wireless mesh network.

Computing system 410 includes processing system 401, storage system 402, software 403, communication interface 408, and user interface 409. Processing system 401 is operatively coupled with storage system 402, communication interface 408, and user interface 409. Processing system 401 loads and executes software 403 from storage system 402. Software 403 includes one or more applications 406 and operating system 407. Applications 406 may include access authorization process 200 in some examples. When executed by computing system 410 in general, and processing system 401 in particular, software 403 directs computing system 410 to operate as described herein for access authorization process 200 or variations thereof. In this example, user interface 409 includes display system 411, which itself may be part of or include a touch screen that also accepts user inputs via touches on its surface. Computing system 410 may optionally include additional devices, features, or functionalities not discussed here for purposes of brevity. Communication interface 408 includes beacon signal communication system 435, which can be based on the BLE protocol or another system suitable for access authorization process 200 or variations thereof (e.g., another close-range beacon-broadcasting system or protocol).

Referring still to FIG. 4, processing system 401 may comprise a microprocessor and other circuitry that retrieves and executes software 403 from storage system 402. Processing system 401 may be implemented within a single processing device but may also be distributed across multiple processing devices or sub-systems that cooperate in executing program instructions. Examples of processing system 401 include general purpose central processing units, application specific processors, and logic devices, as well as any other type of processing device, combinations, or variations thereof.

Storage system 402 may comprise any computer readable media or storage media readable by processing system 401 and capable of storing software 403. Storage system 402 may include volatile and nonvolatile, removable and non-removable media implemented in any method or technology for storage of information, such as computer readable instructions, data structures, program modules, or other data. Storage system 402 may be implemented as a single storage device but may also be implemented across multiple storage devices or sub-systems co-located or distributed relative to each other. Storage system 402 may comprise additional elements, such as a controller, capable of communicating with processing system 401. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 409, processing system 401 loads and executes portions of software 403, such as access authorization process 200, to render a graphical user interface for application 406 for display by display system 411 of user interface 409. Software 403 may be implemented in program instructions and among other functions may, when executed by mobile computing system 410 in general or processing system 401 in particular, direct mobile computing system 410 or processing system 401 to display one or more access authorization operational, utility, status and/or function screens associated with one or more industrial assets of an industrial automation environment on display system 411 of mobile computing system 410. In addition, software 403 directs mobile computing system 410 or processing system 401 to receive a user selection of a discovered industrial asset to be designated as a target device, to determine the distance of the mobile computing system 410 from the target device, to determine what operations are available and/or prohibited to the user of mobile computing system 410, to control interactions between the mobile computing system 410 and target device via a communication link (e.g., a wireless network), and/or to provide additional information about access to a selected industrial asset. Finally, software 403 may direct computing system 410 or processing system 401 to transfer received identifying data and/or other data from the mobile computing system 410 to a full functional network server, wherein the server processes the user request to establish a full functional link between the control device and a target device.

Software 403 may include additional processes, programs, or components, such as operating system software or other application software. Examples of operating systems include Windows®, iOS®, and Android®, as well as any other suitable operating system. Software 403 may also comprise firmware or some other form of machine-readable processing instructions executable by processing system 401.

In general, software 403 may, when loaded into processing system 401 and executed, transform computing system 410 overall from a general-purpose computing system into a special-purpose computing system customized to define and limit beacon-based industrial automation access authorization with regard to target devices in an industrial automation environment as described herein for each implementation. For example, encoding software 403 on storage system 402 may transform the physical structure of storage system 402. The specific transformation of the physical structure may depend on various factors in different implementations of this description. Examples of such factors may include, but are not limited to the technology used to implement the storage media of storage system 402 and whether the computer-readable storage media are characterized as primary or secondary storage.

In some examples, if the computer-readable storage media are implemented as semiconductor-based memory, software 403 may transform the physical state of the semiconductor memory when the program is encoded therein. For example, software 403 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that mobile computing system 410 is generally intended to represent a computing system with which software 403 is deployed and executed in order to implement application 406 and/or access authorization process 200 (and variations thereof). However, mobile computing system 410 may also represent any computing system on which software 403 may be staged and from where software 403 may be distributed, transported, downloaded, or otherwise provided to yet another computing system for deployment and execution, or yet additional distribution. For example, mobile computing system 410 could be configured to deploy software 403 over the internet to one or more client computing systems for execution thereon, such as in a cloud-based deployment scenario.

Communication interface 408 may include communication connections and devices that allow for communication between mobile computing system 410 and other computing systems (not shown) or services, over a communication network 415 or collection of networks. In some implementations, communication interface 408 receives data over communication network 415 and/or via beacon signal communication system 435. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 409 may include a voice input device, a touch input device for receiving a gesture from a user, a motion input device for detecting non-touch gestures and other motions by a user, and other comparable input devices and associated processing elements capable of receiving user input from a user. Output devices such as display system 411, speakers, haptic devices, and other types of output devices may also be included in user interface 409. The aforementioned user input devices are well known in the art and need not be discussed at length here. User interface 409 may also include associated user interface software executable by processing system 401 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. One or more computer-readable storage media having program instructions stored thereon to control beacon-based access authorization in an industrial automation environment, wherein the program instructions, when executed by a computing system implemented at least in part on a mobile device, direct the computing system to at least:
   receive user identity data;
   receive a beacon signal via the mobile device from a beacon system, wherein the beacon system comprises one or more beacons associated with an industrial asset in the industrial automation environment, wherein the beacon signal comprises beacon signal data and further wherein beacon signal data comprises: beacon identity data, distance calculation data, and access level data;
   process received distance calculation data within the mobile device to calculate a distance between the mobile device and the industrial asset;
   receive via the mobile device a user command invoking an industrial automation operation; and
   authorize or prohibit the invoked operation based on the user identity data, the calculated distance, received access level data, and the received user command.

2. The one or more computer-readable storage media of claim 1 wherein the user identity data comprises one of the following: a user type, a user name, a user class, or a user group.

3. The one or more computer-readable storage media of claim 2 wherein the mobile device comprises one of the following: a cell phone, a smartphone, a smart watch, a tablet computer, a laptop computer, a notebook computer, a handheld computer, a wearable computer device, or a gaming device.

4. The one or more computer-readable storage media of claim 1 wherein the distance calculation data comprises beacon transmit power data.

5. The one or more computer-readable storage media of claim 1 wherein each beacon comprises a Bluetooth lower energy (BLE) beacon.

6. The one or more computer-readable storage media of claim 1 wherein the access level data comprises access level authorization based on one of the following: a user type, a user name, a user class, or a user group.

7. The one or more computer-readable storage media of claim 1 further wherein, when the invoked operation is prohibited due to the calculated distance exceeds a threshold distance, the program instructions, when executed by the computing system, direct the computing system to provide distance-related directions on a display system on the mobile device.

8. The one or more computer-readable storage media of claim 1 further wherein the mobile device transmits user activity data pertaining to invoked operations to an industrial automation environment auditing system.

9. The one or more computer-readable storage media of claim 1 wherein at least a portion of the beacon signal data is encrypted when received by the mobile device; and
   further wherein the mobile device is configured to decrypt encrypted beacon signal data.

10. An apparatus to facilitate authorizing access by a mobile device to an industrial asset via wireless communication in an industrial automation environment, the mobile device comprising:
    one or more computer-readable storage media; and
    program instructions stored on the one or more computer-readable storage media that, when executed by a mobile device processing system, direct the mobile device processing system to at least:
    receive user identity data;
    receive beacon signal data from a beacon associated with an industrial asset in the industrial automation environment, wherein beacon signal data comprises: distance calculation data, and access level data;
    process received distance calculation data to calculate a distance between the mobile device and the industrial asset;
    receive a user command invoking an industrial automation operation with regard to the industrial asset; and
    authorize or prohibit the invoked operation based on the user identity data, the calculated distance, received access level data, and the received user command.

11. The apparatus of claim 10 wherein at least a portion of the received beacon signal data is encrypted.

12. The apparatus of claim 10 wherein the user identity data comprises one of the following: a user type, a user name, a user class, or a user group; and further wherein the access level data comprises access level authorization based on one of the following: a user type, a user name, a user class, or a user group.

13. The apparatus of claim 10 wherein the beacon comprises a Bluetooth low energy beacon and further wherein the distance calculation data comprises beacon transmit power data.

14. The apparatus of claim 10 wherein the mobile device comprises one of the following: a cell phone, a smartphone, a smart watch, a tablet computer, a laptop computer, a notebook computer, a handheld computer, a wearable computer device, or a gaming device.

15. The apparatus of claim 10 wherein the program instructions, when executed by the mobile device processing system, direct the mobile device processing system to provide distance-related directions on a display system on the mobile device when an invoked operation is prohibited due to a distance threshold being exceeded.

16. A method of operating a computing system to facilitate authorizing access by a mobile device to an industrial asset via wireless communication in an industrial automation environment, the method comprising:

receiving beacon signal data transmitted by a beacon associated with the industrial asset, wherein beacon signal data comprises: distance calculation data and access level data;

processing received distance calculation data to calculate a distance between the mobile device and the industrial asset;

receiving a user command invoking an industrial automation operation with regard to the industrial asset; and authorizing or prohibiting the invoked operation based on the calculated distance, received access level data, and the received user command.

17. The method of claim 16 wherein at least a portion of the received beacon signal data is encrypted; and further wherein the beacon signal data is loaded into the beacon using one of the following: a computer directly connected to the beacon, an embedded user interface, Bluetooth communication, a central system connected to the beacon using a network.

18. The method of claim 16 wherein the beacon comprises a Bluetooth low energy beacon and further wherein the distance calculation data comprises beacon transmit power data.

19. The method of claim 16 wherein the mobile device comprises one of the following: a cell phone, a smartphone, a smart watch, a tablet computer, a laptop computer, a notebook computer, a handheld computer, a wearable computer device, or a gaming device.

20. The method of claim 16 further comprising providing distance-related directions on a display system on the mobile device when an invoked operation is prohibited due to a distance threshold being exceeded.

* * * * *